No. 890,982. PATENTED JUNE 16. 1908.
J. HISSINK.
ROTARY FIELD MAGNET.
APPLICATION FILED MAY 17, 1906.
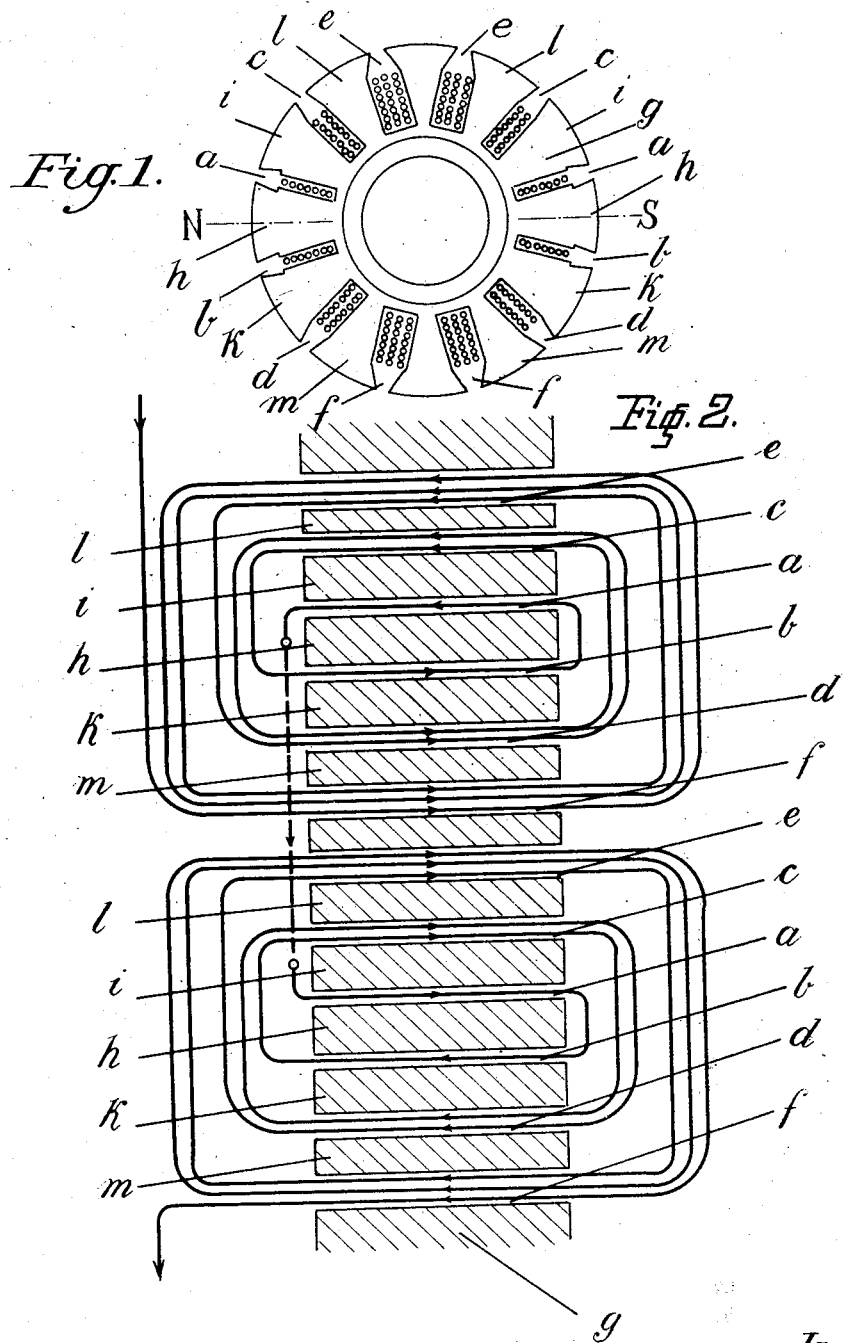
Witnesses:
Inventor:
Jack Hissink
by Eustace W. Hopkins
Attorney

UNITED STATES PATENT OFFICE.

JACK HISSINK, OF BERLIN, GERMANY.

ROTARY FIELD-MAGNET.

No. 890,982.

Specification of Letters Patent.

Patented June 16, 1908.

Application filed May 17, 1906. Serial No. 317,326.

*To all whom it may concern:*

Be it known that I, JACK HISSINK, a subject of the Queen of the Netherlands, and residing at No. 8 Hansa-Ufer, Berlin, Germany, have invented certain new and useful Improvements in Rotary Field - Magnets, of which the following is a full, clear, and exact description.

The present invention relates to rotary field magnets for single and polyphase current generators and consists of a field magnet in the form of a drum and possessing no pole shoes. The field windings of said magnet are arranged in peripheral recesses of equal depth extending radially inwards. The winding is effected by combining several pairs of recesses for instance three pairs to form one pole surface, so that the winding for one pole will first inclose the iron lying between the central pair of recesses and then the copper is laid in the adjacent left and right hand recesses and finally in the last pair of recesses. If the recesses for the reception of the field winding were all of equal cross section, the magnetic field, as will be readily understood, would not correspond to the ordinates of a sine curve and therefore the iron at the ends of the poles would not be fully utilized, because the even distribution and equal cross sections of the recesses would necessarily involve an even distribution of the iron, while the density of the lines of force in the iron segments between the various recesses of a pole is not the same. The density of the lines of force in each pole is greatest in the iron between the central pair of recesses and decreases towards the ends of the poles. Therefore the iron of the field must be chosen sufficiently large to correspond to the greatest density of the lines of force between the central recesses of each pole, otherwise, if the cross sections were even, the iron at the ends of the poles would not be properly utilized.

The present invention consists in making the pairs of recesses of each pole of unequal cross sections, the central pair of recesses of each pole having the smallest cross section and the outside recesses of each pole having the greatest cross section. The increase in the cross sections towards the ends of the pole is effected in such a manner as to cause the magnetic field to approximate a sine curve as closely as possible. Since, with this arrangement of the cross sections of the recesses, the most iron will lie between the central pair of recesses and the cross section of the iron parts or segments will decrease towards the pole ends, a more complete utilization of the iron will be attained at the pole ends, than would be the case if the recesses were of an even cross section throughout. Thus a saving in iron will be effected so that the rotor may be of a smaller diameter, which is of great importance in connection with high speed generators.

In order to render the present specification easily intelligible reference is had to the accompanying drawing in which similar letters of reference denote similar parts in both views.

Figure 1 is a section through the rotary field magnet of a two pole generator, and Fig. 2 shows a developed view of the rotor.

The rotor $g$ is in the form of a drum and may consist of solid or laminated iron, and radial recesses $a, b, c, d, e, f$ are provided in its periphery, of equal radial depth and equi-distant from each other, for the reception of the field windings. The poles of the rotor are indicated at N and S. Each pole possesses six recesses or three pairs of them, $a, b, c, d$ and $e, f$, respectively, the cross sections of which are different, the cross sections of the pair $a, b$ lying closest to the pole center being the smallest and those of the recesses at the pole ends being greatest, as at $e, f$. Fig. 2 shows the arrangement of the winding, the rotor being wound in the form of a drum.

In accordance with their breadth, the recesses $a, b$ nearest to the pole center, contain the least copper, the next lying recesses $c, d$ contain about twice as much copper, while the recesses lying at the pole ends as at $e, f$ contain the most copper. The copper is so distributed that the magnetic field will approximate a sine curve as nearly as possible. That is to say, the distribution of ampere-turns on the rotor follows a sine-law variation, with a corresponding variation of flux density. Owing to the difference in the cross sections of the several recesses the amount of metal left standing between the central pair of recesses $a$ and $b$ at $h$ will be greatest, i. e. this portion will have the greatest cross section, while the cross section of the parts or segments $j, k$ and $l, m$ will decrease towards the pole ends. The greatest density of the lines of force will be in the portions or segments $h$, while the density will be considerably less in the metal left standing towards the pole ends. Since at these points less iron is present, the latter will be more advantageously utilized, than would be the case if the recesses were all of equal cross section.

I claim:

1. A rotary field magnet provided with uniformly distributed recesses of uniform radial depth but of a cross section increasing progressively from recess to recess, from the central portion of the poles to the pole ends.

2. A rotary field magnet provided with uniformly distributed recesses of uniform radial depth to receive the windings, the cross section of said recesses varying in such a manner that the distribution of ampere-turns on the said magnet follows a sine-law variation.

3. A rotary field magnet provided with uniformly distributed recesses of uniform radial depth, the consecutive recesses varying in cross sectional area and the material between said recesses varying in thickness in such a manner that the magnetic field follows a sine-law variation, and that the iron at the ends of the poles will be utilized approximately as fully as at the central pole sections.

4. A rotary field magnet provided with recesses uniform as to radial depth but increasing progressively in cross section from recess to recess from the central portions of the poles to the pole ends.

5. A rotary field magnet provided with recesses uniform as to radial depth but increasing progressively in cross section, from the central portions of the poles to the pole ends the rate of increase being such as to secure a distribution of ampere-turns on the magnet in accordance with a sine-law variation.

6. A rotary field magnet provided with radial recesses the cross section of which increases progressively, from the central portions of the poles to the pole ends.

7. A rotary field magnet provided with radial recesses the cross section of which increases progressively, from the central portions of the poles to the pole ends, the rate of increase being such as to secure a distribution of ampere-turns on the magnet in accordance with a sine-law variation.

In testimony whereof I affix my signature in the presence of two witnesses.

JACK HISSINK.

Witnesses:
 WOLDEMAR HAUPT,
 HENRY HASPER.